US005681885A

United States Patent [19]

Kinoshita et al.

[11] Patent Number: 5,681,885

[45] Date of Patent: Oct. 28, 1997

[54] COATING MATERIAL FOR ANTISTATIC HIGH REFRACTIVE INDEX FILM FORMATION

[75] Inventors: Touru Kinoshita, Funabashi; Kenji Takahashi; Tsuneo Yanagisawa, both of Chiba; Masaru Uehara, Matsudo; Hitoshi Kimata, Narashino, all of Japan

[73] Assignee: Sumitomo Cement Co., Ltd., Tokyo, Japan

[21] Appl. No.: 683,698

[22] Filed: Jul. 18, 1996

Related U.S. Application Data

[60] Continuation of Ser. No. 329,263, Oct. 26, 1994, abandoned, which is a division of Ser. No. 115,419, Aug. 31, 1993, Pat. No. 5,446,339.

[30] Foreign Application Priority Data

| | | | |
|---|---|---|---|
| Aug. 31, 1992 | [JP] | Japan | 4-232336 |
| Feb. 10, 1993 | [JP] | Japan | 5-23070 |
| Jun. 4, 1993 | [JP] | Japan | 5-134968 |

[51] Int. Cl.$^6$ ..... C08K 3/20

[52] U.S. Cl. ..... 524/430; 524/413; 524/910; 252/511

[58] Field of Search ..... 524/413, 430, 524/910; 252/511, 506, 507, 518, 520

[56] References Cited

U.S. PATENT DOCUMENTS 5,384,190 1/1995 Kaburki ..... 428/323

FOREIGN PATENT DOCUMENTS

| | | |
|---|---|---|
| 53-29146 | 3/1978 | Japan . |
| 61-264069 | 11/1986 | Japan . |
| 4-184839 | 7/1992 | Japan . |
| 4-218247 | 8/1992 | Japan . |

*Primary Examiner*—Jeffrey T. Smith

*Attorney, Agent, or Firm*—Kane, Dalsimer, Sullivan, Kurucz, Levy, Eisele and Richard

[57] ABSTRACT

In order to provide a coating material for formation of an antistatic/high refractive index film possessing superior antistatic effects, as well as an antistatic/anti-reflection film covered transparent material laminated body provided with superior antistatic effects and anti-reflection effects obtained by this coating material, and a cathode ray tube possessing this laminated body which is provided with antistatic effects, electromagnetic wave shielding effects, anti-reflection effects, and the effect of increase in contrast, the following are provided: a coating material comprising a dispersion fluid containing a mixture of an antimony doped tin oxide fine powder and a black colored electrically conductive fine powder; an antistatic/anti-reflection film covered transparent material laminated body containing a film layer of the coating material on the surface of a transparent substrate, and a specific low refractive index film layer; and a cathode ray tube possessing on its surface a first layer film containing a mixture of an antimony doped tin oxide fine powder and a black colored electrically conductive fine powder, and a second layer film containing silica sol.

9 Claims, 1 Drawing Sheet

COATING MATERIAL FOR ANTISTATIC HIGH REFRACTIVE INDEX FILM FORMATION

This application is a continuation of application No. 08/329,263 filed Oct. 26, 1994, now abandoned, which application is a division of application No. 08/115,419, filed Aug. 31, 1993, now U.S. Pat. No. 5,446,339.

BACKGROUND OF THE INVENTION

1. Field of the Invention

The present invention relates to coating material used for antistatic high refractive index film formation, as well as to an antistatic/anti-reflection film covered transparent laminated body and an antistatic/anti-reflection film covered cathode ray tube using this coating material.

In particular, the present invention relates to coating material for antistatic/high refractive index film formation which is useful as coating material for transparent substrate surfaces requiring prevention of electrostatic charge and/or prevention of reflection, such as, for example, display screens of display apparatuses, covering materials for these surfaces, window glass, glass for show windows, display screens of TV Braun tubes, display screens of liquid crystal devices, covering glass for gauges, covering glass for watches, windshield and window glass for automobiles, and image display screens of cathode ray tubes, as well as to antistatic/anti-reflection film covered laminated bodies composed of antistatic/high refractive index films using this coating material and low refractive index films, and to cathode ray tubes, at least the image display of which comprises this transparent laminated body, and which are provided with various functions such as antistatic functions, electromagnetic wave shielding functions, anti-reflection functions, and image contrast improvement functions and the like.

2. Background Art

Electrostatic charge builds up easily in transparent substrates for image display, for example, in image display parts of TV Braun tubes, and as a result of this electrostatic charge, a problem is known wherein dust gathers on the display screen. Furthermore, problems are known wherein external light is reflected in the image display screen, or external images are reflected, and thus the images on the display screen become unclear.

In order to to solve the above-described problems, conventionally, a fluid in which finely powdered tin oxide doped with antimony (ATO) was dispersed in a nonaqueous solvent such as the hydrolytic product of silicon alkoxide (hereinbelow termed "silica gel") was applied and desiccated to form an antistatic film on, for example, the surface of a transparent substrate, and a low refractive index film having a refractive index lower than that of the antistatic film was then formed on this antistatic film. That is to say, using a coating material comprising a non-aqueous dispersion fluid containing a mixture of the antimony doped tin oxide fine powder described above and silica sol, an antistatic film was formed, and on this, a coating material comprising a nonaqueous dispersion fluid of silica sol was applied and a low refractive index film was formed.

Furthermore the cathode ray tube which forms the TV Braun tube or the display of a computer or the like displays characters or images or the like by causing an electron beam from an electron gun to impact a fluorescent screen which emits red, green, and blue light. This cathode ray tube radiates an electromagnetic wave as a result of the emission of this high voltage electron beam, and there are cases in which undesirable effects are exerted on human beings or machines in the vicinity thereof. Furthermore, when the electron beam collides with the fluorescent body or bodies, a static charge is generated on the front surface of the faceplate.

Conventionally, in order to solve the above problems, a transparent and electrically conductive oxide film comprising, for example, indium oxide or the like, was formed by the sputtering method or the vapor deposition method on a faceplate, and this faceplate was applied to the front surface of the face panel and thus electromagnetic wave shielding was conducted; alternatively, a transparent and electrically conductive film was formed by coating the front surface of the face panel with a silica type binder dispersion fluid containing antimony doped tin oxide and silica sol or the like, and an antistatic effect was imparted to the front surface of the face panel. Furthermore, as shown in the following formula, in order to improve image contrast, cathode ray tubes were proposed in which colorants such as pigments or the like were included in the antistatic coating fluid, and thus antistatic effects and an increase in contrast were achieved.

$C_r=(\pi B/RT_gL)+1$ $C_r$: contrast

B: fluorescent screen brightness $T_g$: light transmittance of glass

L: external light illumination

R: fluorescent screen reflectivity

Furthermore, cathode ray tubes have also been proposed in which colored antistatic coating fluids are applied by being sprayed onto the display screen, and a film with surface irregularities is thereby formed, thus providing the cathode ray tube with an anti-reflection effect as a result of light scattering.

The refractive index of the conventional antistatic film described above is within a range of n=1.50 to 1.54, and the difference between this refractive index and the refractive index of the low refractive index film which is formed by means of the hydrolytic product of silicon alkoxide (silica sol) is small, so that accordingly, the anti-reflection effect created by means of the combining of such a conventional antistatic film and a low refractive index film is insufficient, and such a product was thus not suitable for practical application.

Furthermore, cathode ray tubes which were obtained by a method in which a faceplate having formed thereon a transparent and electrically conductive film such as, for example, indium oxide or the like, by means of the sputtering method or vapor deposition method, was applied to a display screen, are extremely expensive. Moreover, in cathode ray tubes having applied thereto an antistatic/optical filter, obtained by a method in which a colored antistatic fluid was coated thereon, possess insufficient electric conductivity, so that sufficient electromagnetic shielding effects could not obtained, and furthermore, in the case of cathode ray tubes having applied thereto antistatic/optical filter/anti-reflection functions formed by means of a method in which colored antistatic coating fluid was applied by spraying, as a result of these surface irregularities of the film which was thus formed, a problem existed in that as a result of the surface irregularities of the film which was thus formed, the degree of resolution of the images declined sharply.

SUMMARY OF THE INVENTION

The present invention was created in light of the above circumstances; it has an object thereof to provide a coating material for formation of an antistatic/high refractive index film possessing superior antistatic effects, as well as an antistatic/anti-reflection film covered transparent material laminated body provided with superior antistatic effects and anti-reflection effects obtained by means of the use of this coating material, and a cathode ray tube possessing this laminated body which is provided with antistatic effects, electromagnetic wave shielding effects, anti-reflection effects, and the effect of increase in contrast.

It was discovered that by mixing an antimony doped tin oxide fine powder with a black colored electrically conductive fine powder, the problems present in the background art described above could be solved, and based on this discovery, the present invention was accomplished.

That is to say, the coating material for use in formation of an antistatic/high refractive index film in accordance with the present invention is characterized by comprising a dispersion fluid containing a mixture of an antimony doped tin oxide fine powder and a black colored electrically conductive fine powder.

Furthermore, the antistatic/anti-reflection film covered transparent material laminated body in accordance with the present invention is characterized by containing: a transparent substrate; an antistatic/high reflective index film layer, formed by the application and the desiccation of a coating material comprising a dispersion fluid containing a mixture of antimony doped tin oxide fine powder and black colored electrically conductive fine powder on the surface of the transparent substrate; and a low refractive index film layer, which is formed on this antistatic/high refractive index film layer and which possesses a refractive index which is 0.1 or more lower than the refractive index of the antistatic/high refractive index film layer.

Furthermore, in the cathode ray tube in accordance with the present invention, the formation on at least the front surface thereof of a first layer film containing a mixture of an antimony doped tin oxide fine powder, and a black colored electrically conductive fine powder, and of a second layer film, which is formed on the first layer film and which contains silica sol which is obtained by the hydrolysis of silicon alkoxide, was used as the means for the solution of the problems described above.

According to the present invention, a black colored conductive fine powder, for example, carbon black fine powder, which is light absorbing and possesses a higher conductivity than antimony doped tin oxide fine powder, is added to the antimony doped tin oxide fine powder; that is to say, a conductive fine powder (ATO) and a black colored conductive fine powder are mixed, in other words two types of conductive fine powder are added together, and thereby, it is possible to produce an application fluid for use in formation of an antistatic/high refractive index film possessing a more superior two-type antistatic effect.

It is for this reason that the antistatic/high refractive index film layer obtained by the use of the coating material for use in formation of an antistatic/high refractive index film layer in accordance with the present invention exhibits an extremely superior antistatic effect and electromagnetic wave shielding effect. In addition, the antistatic/high refractive index film layer exhibits a high refractive index.

In the transparent laminated body in accordance with the present invention, the reflected light at the substrate surface is reduced, so that by providing a low refractive index film having an index of refraction which is more than 0.1, and preferably more than 0.15, less than that of the antistatic/high refractive index film on the antistatic/high refractive index film, it is possible to provide extremely superior anti-reflection effects.

Accordingly, the laminated body of the present invention is extremely useful in display screens of display devices, covering materials for the surfaces thereof, window glass, show window glass, display screens of TV Braun tubes, display screens of liquid crystal apparatuses, covering glass for gauges, covering glass for watches, windshield and window glass for automobiles, and front image screens of CRTs'.

Furthermore, when an antistatic/high refractive index film layer and a low refractive index film layer obtained by means of the present invention are combined into a single film and formed on a display screen of a Braun tube or the like, the effects achieved are not merely those of an increase in visibility resulting from the prevention of reflection and antistatic effects, but rather, as the display screen possesses an antimagnetic wave shielding effect, and as the display screen has a black color, image contrast is improved, and visibility is further improved as a result thereof.

DETAILED DESCRIPTION OF THE PREFERRED EMBODIMENTS

Figure 1:
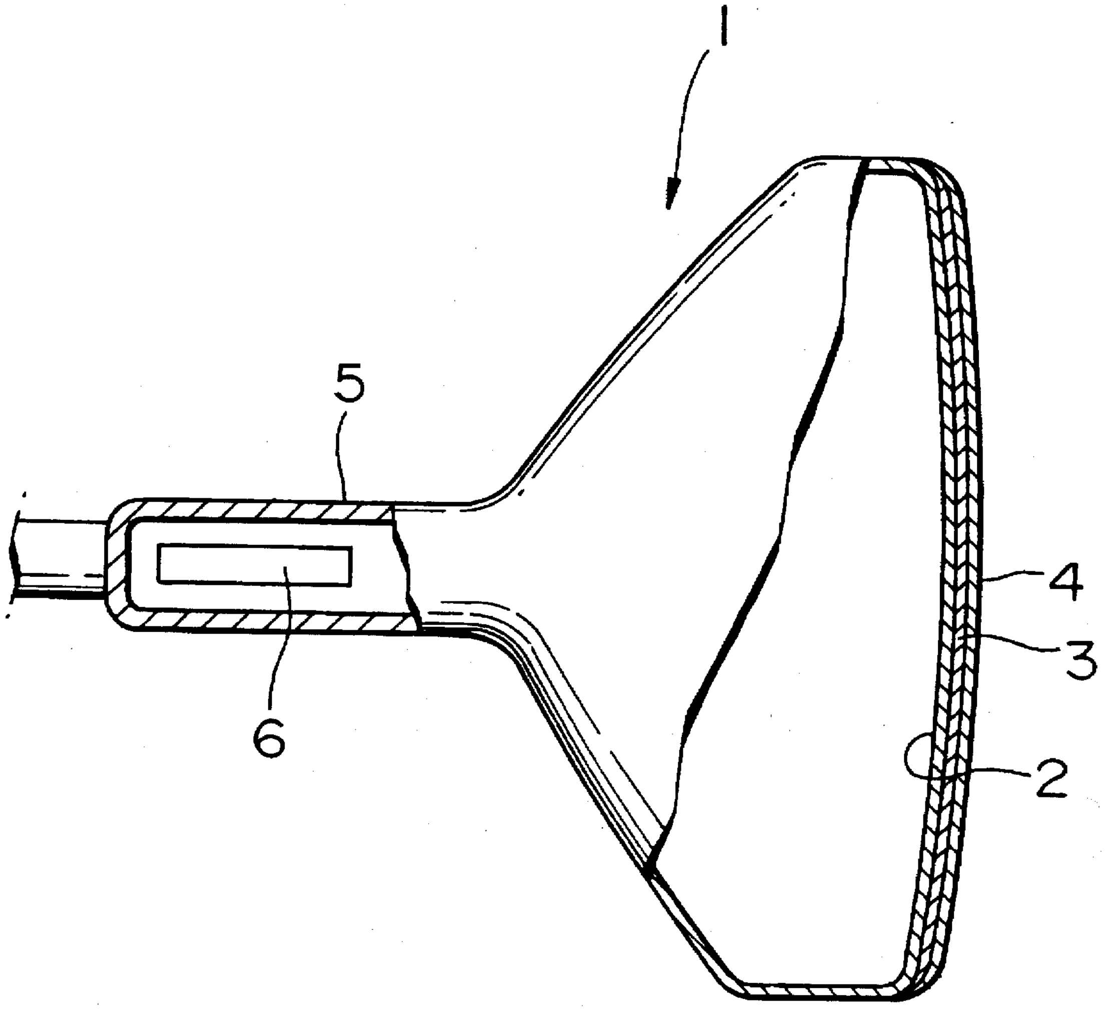
FIG. 1 is a side view showing a cathode ray tube (TV Braun tube) in accordance with Preferred Embodiments 16, 17, and 18 of the present invention, from which a portion has been removed.

Hereinbelow, the present invention will be explained in detail.

First, the coating material for use in formation of an intistatic/high refractive index film in accordance with the present invention will be explained.

In the mixture of antimony doped tin oxide fine powder and black colored electrically conductive fine powder which is used in the coating material for formation of an antistatic/high refractive index film, the proportion of the amount contained of the black colored electrically conductive fine powder and the amount contained of the antimony doped tin oxide fine powder should preferably be within a range of 1:99 to 30:70. If the amount contained of black colored conductive fine powder exceeds 30 parts by weight with respect to 100 parts per weight of the total of the black colored electrically conductive fine powder and the antimony doped tin oxide fine powder, the amount of black colored electrically conductive fine powder will be excessive, and the transparency of the film layer obtained will sharply decrease, and in the case in which such a laminated film is formed on the display screen of a display apparatus, the visibility will become extremely poor.

Furthermore, when the amount contained of the black colored electrically conductive fine powder is less than 1 part per weight with respect to 100 parts per weight of the total of the black colored electrically conductive fine powder and the antimony doped tin oxide fine powder then the conductivity of the antistatic/high refractive index film layer which is obtained will not increase, and furthermore, almost no light absorption is generated, so that, even if a low refractive index film layer is formed on the antistatic/high refractive index film layer, only antistatic and anti-reflection effects which are identical to the conventional effects can be obtained, and these effects are insufficient for such an antistatic and anti-reflection film.

The black colored electrically conductive fine powder which is used in the present invention may be of a black, gray, blackish gray, or blackish brown shade, and must be a fine powder which possesses conductivity. For example, fine powders which may be employed include, for example, oxide fine powders, sulfide fine powders, or metallic fine powders, such as carbon black, titanium black, metallic silicon, tin sulfide, mercury sulfide, metallic cobalt, metallic tungsten, or the like. In particular, carbon black fine powders such as kitchen black, furnace black, graphite powder, and the like, are preferable.

In the case of the use of a carbon black fine powder, no special restriction is made with respect to particle diameter; however, from the point of view of dispersion stability of the coating material, it is preferable that a powder having a particle diameter of less than 1 micrometer be employed.

In the antimony doped tin oxide fine powder which is used in the present invention, the tin oxide may be produced by one of the previously known methods: the gas phase method (wherein the appropriate compound is gasified and then cooled and solidified in the gas phase), the CVD method (wherein the component elements are gasified, reacted in the gas phase, and the product is cooled and solidified), and the carbonate (or oxalate) method (wherein carbonates or oxalates of the appropriate metallic elements are converted in the gas phase, are cooled, and are. solidified). Furthermore, an acid alkaline method in which an aqueous solution of fluorides of the component elements and an aqueous solution of a basic compound are mixed and reacted, and an ultra-fine grained sol of the target compound is produced, or a hydrothermal method in which the solvent is then removed, may be employed in the production of the antimony doped tin oxide fine powder. In the above hydrothermal method, it is possible to conduct the growth, spheroidizing, or surface reformation of the fine particles. Furthermore, no separate restriction is made with the respect to the form of these fine particles; a shape such as a spherical shape, a needle shape, a plate shape, or a chain shape or the like may be employed.

No particular restriction is made with respect to the doping method of the antimony with respect to the tin oxide. Furthermore, it is preferable that the doped amount of antimony be within a range of 1 to 5 weight percent with respect to the weight of the tin oxide. By means of this type of antimony doping, the antistatic effects and electromagnetic wave shielding effects of the tin oxide fine powder will be further increased.

Furthermore, with respect to the particle diameter of the antimony doped tin oxide, it is preferable that the average particle diameter be within a range of 1 to 100 nm. The reason for this is that if the average particle diameter is less than 1 nm, the conductivity decreases, and as the particles coagulate easily in the coating material, a uniform dispersion becomes difficult, and furthermore, the viscosity thereof increases and dispersion problems are caused, and as a result of increasing the necessary amount of solvent in order to prevent such problems, the concentration of the antimony doped tin oxide fine powder becomes too low. Furthermore, when the average particle diameter exceeds 100 nm, the antistatic/high refractive index film layer exhibits striking irregular reflection of light as a result of Rayleigh scattering, and the degree of transparency decreases so as to make the product white in appearance.

Furthermore, dispersants such as anionic surfactants, cationic surfactants, ampholytic surfactants, and non-ionic surfactants may be used to disperse the carbon black fine powder; a polymeric dispersant is preferably used.

In the case in which a polymeric dispersant is used in the coating material for formation of an antistatic/high refractive index film of the present invention, it is preferable to use a mixture in which 0.01 to 0.5 weight percent of polymeric dispersant is added to 100 parts by weight of the fine powder mixture comprising antimony doped tin oxide fine powder and black colored electrically conductive fine powder. The reason for this is that if the amount of polymeric dispersant exceeds 0.5 parts per weight, the thickness of the adhesion layer of the dispersant becomes too large and the contact between particles is hindered, and the conductivity of the antistatic/high refractive index film layer which is obtained thereby cannot be increased, and furthermore, even if a low refractive index film layer is formed on this film layer, only those antistatic/anti-reflection effects which were obtainable with the conventional technology can be obtained. On the other hand, when the amount is less than 0.01 parts per weight, the dispersion of the fine particles is insufficient, and the fine particles coagulate, so that the conductivity of the antistatic/high refractive index film layer which obtained cannot be increased, and accordingly, even if a low refractive film index layer is formed on this film layer, sufficient antistatic/anti-reflection effects cannot be obtained; furthermore, as a result of the coagulation of the particles, the degree of haze present in the film becomes high.

Anionic polymeric surfactants possessing carboxylic acid or sulfonic acid groups, specific examples of which include polymeric polycarboxylate, polystyrene sulfonate, and salts of naphthalene sulfonic acid condensates may be used as the polymeric dispersant, and these polymeric dispersants may be used singularly or in a mixture of two or more of the above. It is also possible to use this type of polymeric dispersant concurrently with the anionic surfactants which were conventionally employed; however with only the anionic surfactants which were present is conventional detergents and the like, the dispersion does not increase in comparison with the case in which only polymeric dispersant is used, and as a result, it is impossible to sufficiently achieve an increase in fineness and an increase in refractive index of the first layer, and furthermore, bubbling becomes strong and surface tension decreases excessively, so that during the formation of the low refractive index film layer, wettability becomes poor, and it is impossible to sufficiently obtain the object of the present invention.

The dispersion fluid comprising the coating material for formation of an antistatic/high refractive index film of the present invention may be a mixture in which, in addition to solid components comprising an antimony doped tin oxide fine powder and a black colored electrically conductive fine powder, a solvent possessing a high boiling point and a high surface tension is included.

It is preferable that the above-described solvent have a boiling point above 150° C. and a surface tension of 40 dyne/cm or greater.

It is preferable that the above solvent be selected from a group comprising ethylene glycol, propylene glycol, formamide, dimethyl sulfoxide, and diethylene glycol.

Examples of the high boiling point/high surface tension solvent used in the present invention include, for example, ethylene glycol, propylene glycol, formamide, dimethyl sulfoxide, diethylene glycol, and the like, and a mixture of two or more of these solvents may also be used.

It is possible to concomitantly use other solvents; however it is necessary to select and adopt an appropriate solvent, which will permit satisfactory film formation without the loss of the conductivity and high refractive index which comprise objects of the present invention, by means of preparatory experiments in which the types of solvents present in the dispersion fluid, or the proportions thereof, are varied.

In the dispersion fluid containing solid components comprising antimony doped tin oxide fine powder and black colored conductive fine powder and a solvent possessing a high boiling point and high surface tension, it is preferable that the solvent having a high boiling point and a high surface tension be present in the dispersion fluid in an amount within a range of 0.1 to 10 parts per weight with respect to 100 parts per weight of the dispersion fluid. If the proportion of solvent possessing a high boiling point and a high surface tension in the dispersion fluid exceeds 10 parts per weight, there are cases in which the time required for vaporization of the solvent becomes excessive, thus causing irregularities in desiccation. For this reason, when a low refractive index film is applied on this film, inter-layer mixing occurs, and film formation of the second layer film cannot be conducted according to plan, so that sufficient conductivity and anti-reflection characteristics cannot be obtained. On the other hand, when the amount of this solvent is less than 0.1 parts per weight, the attraction between particles is insufficient, and the filling of particles within the film cannot be increased, so that the increase in fineness and increase in refractive index of the film cannot be sufficiently achieved. For this reason, the conductivity of the antistatic/high refractive index film which is obtained cannot be increased, and even if the low refractive index film is formed on top of this film, only those antistatic/anti-reflection effects which were obtainable in the conventional art can be obtained.

Furthermore, in order to fix the antimony doped tin oxide particles or the carbon black particles on the substrate, an inorganic binder such as silicon oil, silicon alkoxide hydrolytic product or the like, or an organic binder such as acrylic resin, urethane resin, epoxy resin, or the like, may be added. Furthermore, in such a case, in order to obtain the conductivity which is an object of the present invention, it is necessary to appropriately select such a binder by conducting preparatory tests in which the weight ratio (binder)/(conductive powder) is varied.

The dispersants and binders may be used even in cases in which black colored conductive fine powders other than carbon black are used.

The coating material for use in the formation of the first layer of film described above is obtained by the mixing and dispersion of antimony doped tin oxide fine powder and black colored conductive fine powder and a dispersant and/or a solvent possessing a high boiling point and a high surface tension, by means of a method in which mixing and dispersion is conducted in water or in an organic solvent using an ultrasonic homogenizer or a sand mill or the like.

Next, an explanation will be made of the antistatic/anti-reflection film coated transparent material laminated body in accordance with the present invention.

Examples of the transparent substrate which is used in the transparent material laminated body include substrates selected from a group consisting of glass materials, plastic materials and the like. The coating material of the present invention is applied to this transparent substrate, is desiccated to form an antistatic/high refractive index film layer, and furthermore, on this antistatic/high refractive index film layer, a low refractive index film layer is formed which has a refractive index which is 0.1 or more less than the refractive index of the antistatic/high refractive index film layer, and thereby, the transparent material laminated body of the present invention is obtained.

The substrate for use in the laminated body of the present invention is preferably of transparent material; however, the material for the substrate is not limited thereto, and ferrous material, aluminum material and other nonferrous metal material, or alloys thereof are also applicable as the substrate as well as wood or concrete.

No particular limitation is made with respect to the thickness of the antistatic/high refractive index film layer Which is formed on the transparent substrate; however in general, a thickness in the range of 0.05 to 0.5 micrometers is preferable.

A low refractive index film layer is formed on the antistatic/high refractive index film layer which is formed using the coating material of the present invention. The low refractive index film layer fills the cavities present in the antistatic/high refractive index film layer surface, suppresses light scattering, and is effective in increasing the resistance to abrasion.

It is possible to form the low refractive index film layer by applying a coating material comprising a nonaqueous solution containing silicon alkoxide to the antistatic/high refractive index film layer, desiccating this, and subjecting this to a baking process.

The silicon alkoxide which is used in the coating material for the formation of a low refractive index film described above may be selected from a group comprising tetraalkoxy silane type compounds, alkyltrialkoxy silane type compounds, dialkyldialkoxy silane type compounds, and the like, and furthermore, the nonaqueous solvent may be selected from a group containing alcohol type compounds, glycol-ether type compounds, ester type compounds, and ketone compounds.

These compounds may be used singly, or in a mixture of two or more of the above.

When the above-described coating material is applied to the antistatic/high refractive index film layer, is desiccated, and is subjected to a baking process, the silicon alkoxide hydrolytic product thereof is silica. The index of refraction of silica is n=1.46, which is lower than the refractive index of antimony doped tin oxide; however, in order to increase the size of the difference in refractive index between the antistatic/high refractive index film layer and the low refractive index film layer, the concomitant use of a substance having a refractive index which is lower than that of silicon and having high transparency is preferable.

In the present invention, it is preferable to include magnesium fluoride (n=1.38) fine powder in the coating material containing silicon alkoxide.

No particular limitation is made with respect to the percentage of magnesium fluoride fine powder which is contained in the low refractive index film layer, and it is possible to appropriately set this percentage in accordance with the structure of the antistatic/high refractive index film layer; however, in general, an amount within a range of 0.01 to 80 percent with respect to the weight of silicon alkoxide ($SiO_2$ conversion) is preferable.

It is preferable that the magnesium fluoride fine powder which is used in the formation of the low refractive index film layer have an average particle diameter within a range of 1 to 100 nm. If the average particle diameter exceeds 100 nm, in the low refractive index film layer which is obtained, light will be irregularly reflected as a result of Rayleigh scattering, and the low refractive index film layer will appear white, so that the transparency thereof declines.

Furthermore, when the average particle diameter of the magnesium fluoride fine powder is less than 1 nm, the fine particles coagulate easily, and accordingly, uniform dispersion of the fine particles in the coating material becomes difficult, and the viscosity of the coating material becomes excessive. Furthermore, when the amount of solvent used is increased in order to reduce the viscosity of the coating material, a problem is caused in that the concentration of the magnesium fluoride fine powder and the silicon alkoxide in the coating material is decreased.

The magnesium fluoride fine powder which is used in the present invention may be produced by means of a previously known method, such as a gas phase method, the CVD method, the carbonate or oxalate method, or the like. Furthermore, it is possible to use an acid alkaline method, in which aqueous solutions of fluorides of the component elements and aqueous solutions of basic compounds are mixed and reacted, an ultrafine grained sol of the target compound is produced, or to use a hydrothermal method, in which the solvent is then removed, for the production of the magnesium fluoride fine powder. In the above-described hydrothermal method, it is possible to conduct the growth, spheroidizing, or surface reformation of the fine particles. Furthermore, a spherical shape, a needle shape, a plate shaped, or a chain shape are satisfactory shapes for these fine particles.

In the present invention, no particular limitation is made with respect to the thickness of the low refractive index film layer; however, a thickness within a range of 0.05 to 0.5 micrometers is preferable. The reason for this is that a low refractive index film layer having a thickness within the above described range is comparatively thin, so that even if such a film layer covers the antistatic/high refractive index film layer, as a result of the conductivity of the antistatic/high refractive index film layer, antistatic effects and electromagnetic wave shielding effects which are sufficient for practical application can be exhibited.

Next, an explanation will be made of the creation of the antistatic/anti-reflection film covered transparent material laminated body of the invention First, a first layer is created on a transparent substrate, using the coating material for formation of an antistatic/high refractive index film described above.

Next, a second layer film is formed on the first layer film which is thus obtained, by use of the coating material for formation of a low refractive index film described above.

Concrete examples of coating materials used in the second layer include, for example, solvents in which a silicon alkoxide such as tetramethoxy silane, tetraethoxy silane, methyl trimethoxy silane or the like, are added to an alcohol such as methanol, ethanol, propanol, butanol, or the like, an ester such as ethyl acetate, an ether such as diethyl ether or the like, a ketone, an aldehyde, or one or a mixture of two or more organic solvents such as ethyl cellosolve, and water, and acid such as hydrochloric acid, nitric acid, sulfuric acid, phosphoric acid, or the like is added thereto, hydrolysis is carried out, and silica sol is produced.

The spin coat method, the spray method, the dip method, or the like may be used as the application method for the coating material which is used in the formation of the first and second layers. In the case described below in which this is applied to a cathode ray tube, it is preferable that the spin coat method be employed in order to form a film having a uniform thickness on the front surface.

In an antistatic/anti-reflection film coated transparent material laminated body obtained in this manner, in the first layer antistatic/high refractive index film layer, a black colored conductive fine powder having a higher conductivity than the antimony doped tin oxide is added to the antimony doped tin oxide, and thereby, in addition to the antistatic effect, an electromagnetic wave shielding effect, and the effect of an increase in screen contrast by means of light absorption, are exhibited. Furthermore, on the first layer film, a low refractive index film layer (second layer) having a lower index of refraction than the first layer film is formed, and thereby, as a result of a combination of the first layer and the second layer, an optical anti-reflection effect is exhibited.

Furthermore, the transparent material laminated body described above may be concretely employed in a cathode ray tube.

This cathode ray tube is comprised by forming a first layer high refractive index film, containing a solid component in which antimony doped tin oxide, and at least one of carbon black fine powder, graphite fine powder, and titanium black fine powder, which have higher conductivity than antimony doped tin oxide, is simultaneously present, on the image display screen (face panel) of the front surface of a cathode ray tube, and on top of this, forming a second layer low refractive index film containing silica sol which is obtained by the hydrolysis of silicon alkoxide.

In the first layer film formed by means of the above-described coating material, a black colored conductive fine powder having a higher conductivity than antimony doped tin oxide is added to antimony doped tin oxide, and by means of this, in addition to an antistatic effect, an electromagnetic wave shielding effect, and an effect of an increase in image contrast as a result of light absorption, can be achieved. Furthermore, by forming a second layer film on top of the first layer film, which second film has a lower index of refraction than the first layer, it is possible to achieve an optical anti-reflection effect by means of the combination of the first layer and the second layer.

Furthermore, a cathode ray tube in which a first layer high refractive index film is formed from an aqueous dispersion fluid comprising antimony doped tin oxide, and at least one of carbon black fine powder, graphite fine powder, and titanium black fine powder, which have higher conductivities than antimony doped tin oxide and absorb light, and furthermore a polymeric dispersant selected from a group containing polycarboxylic acid, polystyrene sulfonic acid, and naphthalene sulfonic acid condensate salts, is formed, and on this, a second layer low refractive index film containing silica sol obtained by the hydrolysis of silicon alkoxide is formed.

Hereinbelow, the functions and effects obtained by the use of the antistatic/high reflective index film layer of the present invention, which contains the antimony doped tin oxide fine powder and black colored conductive fine powder obtained as described above, will be explained.

In conventional coating materials for formation of antistatic films which did not contain black colored conductive fine powder, the change in conductivity and increase in index of refraction of the antistatic/high refractive index film layer was determined solely by the antimony doped tin oxide fine powder.

However, in the present invention, a black colored conductive fine powder, for example, carbon black fine powder, which is light absorbing and possesses a higher conductivity than antimony doped tin oxide fine powder, is added to the antimony doped tin oxide fine powder; that is to say, a conductive fine powder (ATO) and a black colored conductive fine powder are mixed, in other words two types of conductive fine powder are added together, and thereby, it is possible to produce an application fluid for use in formation of an antistatic/high refractive index film possessing a more superior two-type antistatic effect.

It is for this reason that the antistatic/high refractive index film layer obtained by the use of the coating material for use in formation of an antistatic/high refractive index film layer in accordance with the present invention exhibits an extremely superior antistatic effect and electromagnetic wave shielding effect. In addition, the antistatic/high refractive index film layer exhibits a high refractive index within a range of n=1.55 to 2.0.

Furthermore, in the coating material for formation of an antistatic/high refractive index film comprising an aqueous dispersion fluid containing a mixture of antimony doped tin oxide fine powder, black colored conductive fine powder, and a polymeric dispersant, a polymeric dispersant is added to antimony doped tin oxide fine powder and carbon black fine powder, so that the polymeric dispersant adheres to the surfaces of the antimony doped tin oxide fine powder and the carbon black fine powder, and it is thereby possible to greatly improve the dispersion of these fine powders. Accordingly, when this coating material is applied and desiccated, the coagulation of the particles is prevented, the filling ratio of the film is increased, and a state approaching maximum density filling is produced. By means of this, the contact between particles is further improved, and a superior antistatic effect can be obtained. Furthermore, by means of an extreme reduction in gaps between particles, a high refractive index within a ratio of n=1.6 to 2.0 is exhibited.

Furthermore, in a coating material comprising a dispersion fluid containing a mixture of solid components comprising an antimony doped tin oxide fine powder and a black colored conductor for fine powder and a solvent possessing a high boiling point and high surface tension, in the processing in which this coating material is applied on a substrate and desiccated, even if other highly volatile solvents are present, after the vaporization thereof, the solvent possessing a high boiling point and high surface tension is present in the film until the point in time immediately prior to desiccation. When this solvent is vaporized, as it possesses high surface tension, the solvent draws the particles together, and by means of this, the filling of the film is increased, and a state approximating maximum density filling is produced. By means of this, the contact of the particles can be improved. In addition, an effect is obtained of strikingly reducing the gaps between particles. As a result, a film is formed which is finely filled with solid components, and a film possessing an antistatic effect and an increase in refractive index which are superior to those of conventional examples is realized. As a result, the antistatic/high refractive index film which is obtained by use of the coating material for formation of an antistatic/high refractive index film exhibits extremely superior antistatic effects and electromagnetic wave shielding effects. In addition, the antistatic/high refractive index film exhibits a high index of refraction within a range of n (index of refraction)=1.6 to 2.0.

In the transparent laminated body in accordance with the present invention, the reflected light at the substrate surface is reduced, so that by providing a low refractive index film having an index of refraction which is more than 0.1, and preferably more than 0.15, less than that of the antistatic/high refractive index film on the antistatic/high refractive index film, it is possible to provide extremely superior anti-reflection effects. This is the case because the reflected light from the low refractive index film surface and the reflected light from the antistatic/high refractive index film boundary tend to cancel one another out as a result of interference, and furthermore, as a result of the carbon black particles present in the high refractive index film, the external light which penetrates the antistatic/high refractive index film is absorbed. By means of this, it is possible to increase the anti-reflection effect to a level greater than that present in the conventional art.

The above-described coating material for formation of antistatic/high refractive index films makes possible the easy formation of a film layer having superior antistatic properties and a high index of refraction on the transparent substrate, and in particular, by means of combining an antistatic/high refractive index film layer obtained by the use thereof with a low refractive index layer, it is possible to provide an antistatic/anti-reflection film covered transparent material laminated body which is well suited to practical applications.

That is to say, by means of the use of a coating material containing antimony doped tin oxide fine powder and black colored conductive fine powder, that is to say, a coating material containing two types of conductive particles, it is possible to obtain an antistatic/high refractive index film layer possessing strong antistatic properties and a high index of refraction. By means of combining this antistatic/high refractive index film layer with a low refractive index layer, it is possible to obtain an antistatic/anti-reflection film coated transparent material laminated body possessing superior antistatic properties and anti-reflection properties.

Because the laminated body of the present invention exhibits these types of effects, it is extremely useful in display screens of display devices, covering materials for the surfaces thereof, window glass, show window glass, display screens of TV Braun tubes, display screens of liquid crystal apparatuses, covering glass for gauges, covering glass for watches, windshield and window glass for automobiles, and front image screens of CRTs.

Furthermore, when an antistatic/high refractive index film layer and a low refractive index film layer obtained by means of the present invention are combined into a single film and formed on a display screen of a Braun tube or the like, the effects achieved are not merely those of an increase in visibility resulting from the prevention of reflection and antistatic effects, but rather, as the display screen possesses an antimagnetic wave shielding effect, and as the display screen has a black color, image contrast is improved, and visibility is further improved as a result thereof. Furthermore, by creating a three-layered structure in which a low refractive index film having an irregular surface is formed on the low refractive index film described above, it is possible to obtain an antiglare effect in which the outline of the reflected images is prevented from becoming unclear. By means of this, prevention of reflection as a result of optical interference, and an increase in image contrast as a result of imparting a black color to the screen, antiglare effects are obtained, and thereby, it is possible to obtain a display screen possessing superior visibility.

The present invention will be explained furthermore in detail based on the following Preferred Embodiments. However, the present invention is in no way limited to the Preferred Embodiments described below.

(Preferred Embodiment 1)

(1) A coating material (A) for formation of an antistatic/high refractive index film layer was prepared as described hereinbelow (carbon black/antimony doped tin oxide=10/90 weight ratio).

1.8 g of antimony doped tin oxide fine powder (produced by Sumitomo Cement, Co., Ltd. ), 0.2 g of carbon black fine powder (produced by Mitsubishi Kasei Corporation: Trademark MA-7), and 0.2 g of anionic surfactant (produced by Kao Corporation: Trademark Poizu 521) were added to a mixed fluid of 77.8 g of water, 10 g of ethanol, and 10 g of ethyl cellosolve, this was caused to disperse for a period of 10 minutes in an ultrasonic homogenizer (produced by Central Kagaku: Sonofier 450), and a uniform dispersion fluid was obtained.

(2) A coating material (a) for formation of a low refractive index film was prepared by means of the following operations. That is to say, 0.8 g of tetraethoxy silane, 0.8 g of 0.1N hydrochloric acid, and 99.2 g of ethyl alcohol were mixed, and a uniform solution was obtained.

(3) Production of the Laminated Body

At a temperature of 40° C., the coating material (A) described above was applied by the spin coating method onto a surface of a glass substrate, and this was desiccated for a period of 3 minutes in hot air at a temperature of 50° C. An antistatic/high refractive index film layer having a thickness of 0.1 micrometers was thus formed.

Next, at a temperature of 40° C., the coating material (a) described above was applied by the spin coating method onto a surface of the antistatic/high refractive index film layer, this was desiccated in hot air at a temperature of 50° C., and was then subjected to a baking process for a period of 20 minutes at a temperature of 150° C., and a low refractive index film layer having a thickness of 0.1 micrometers was formed.

(4) Evaluation

The full spectrum transmissivity, surface resistivity (as measured by a surface ohm meter), and surface reflectivity (a single surface value of the reflectivity of light having a wavelength of 550 nm was measured using a spectrophotometer having a mirror reflection jig having an angle of incidence of 5°) of a transparent material laminated body obtained as described above, and the adherence of the antistatic/high refractive index film layer and the low refractive index film layer (eraser test, load 1 kg, 20 strokes), were measured. The results of the evaluation are shown in Table 1.

(Preferred Embodiment 2)

Operations were conducted which were identical to those of Preferred Embodiment 1. However, the carbon black/antimony doped tin oxide ratio in the coating material for the formation of an antistatic/high refractive index film layer was set equal to 1/99 (weight ratio).

Results of the evaluation are shown in Table 1.

(Preferred Embodiment 3)

Operations were conducted which were identical to those of Preferred Embodiment 1. However, the carbon black/antimony doped tin oxide ratio in the coating material for formation of an antistatic/high refractive index film layer was set equal to 20/80 (weight ratio). The results of the evaluation are shown in Table 1.

(Preferred Embodiment 4)

Operations were conducted which were identical to those of Preferred Embodiment 1. However, the carbon black/antimony doped tin oxide ratio in the coating material for formation of an antistatic/high refractive index film layer was set equal to 30/70 (weight ratio). The results of the evaluation are shown in Table 1.

(Preferred Embodiment 5)

Operations were conducted which were identical to those of Preferred Embodiment 1. However, in place of the coating material (a) for formation of a low refractive index film layer, a coating material (b) which was prepared as described hereinbelow was used.

That is to say, 0.4 g of magnesium fluoride fine powder (produced by Sumitomo Cement, particle diameter: 10 to 20 nanometers) was mixed with 0.6 g of tetraethoxy silane, 10 g of water, 0.6 g of 0.1N hydrochloric acid, and 89 g of ethyl alcohol, and this was uniformly dispersed.

The results of the evaluation are shown in Table 1.

(Comparative Example 1)

Operations were conducted which were identical to those of Preferred Embodiment 1. However, the carbon black/antimony doped tin oxide ratio in the coating material for formation of an antistatic/high refractive index film layer was set equal to 0/100 (weight ratio). That is to say, no carbon black fine powder was contained.

The results of the evaluation are shown in Table 1.

(Comparative Example 2)

Operations were conducted which were identical to those of Preferred Embodiment 2. However, the carbon black/antimony doped tin oxide ratio in the coating material for formation of an antistatic/high refractive index film layer was set equal to 40/60 (weight ratio).

The results of the evaluation are shown in Table 1.

As is clear from the results of the evaluations which are shown in Table 1, the antistatic/anti-reflection film covered transparent material laminated body containing a transparent substrate, an antistatic/high refractive index film layer formed from a coating material for formation of an antistatic/high refractive index film comprising a dispersion fluid containing a mixture of 70 to 99 parts per weight of antimony doped tin oxide fine powder and 1 to 30 parts per weight of carbon black fine powder, and a low refractive index film layer having a refractive index which is 0.1 or more less than the refractive index of the antistatic/high refractive index film layer, has sufficient light transmissivity, has low surface reflection and reflectivity, and possesses a two-type antistatic function and anti-reflection function having practical applicability, when used for display screens of display apparatuses, screen covering material, window glass, show window glass, display screens of TV Braun tubes, display screens of liquid crystal apparatuses, cover glass for gauges, cover glass for watches, windshield and window glass for automobiles, and front image screens of CRTs.

Furthermore, by containing a magnesium fluoride fine powder in dispersed fashion in the above-described low refractive index film layer, it is possible to increase the anti-reflection function of the antistatic/anti-reflection film covered transparent material laminated body.

(Preferred Embodiment 6)

(1) A coating material (A) for formation of antistatic/high refractive index film was prepared as described hereinbelow.

1.9 g of a mixed fine powder (carbon black/antimony doped tin oxide=5/95 [weight ratio]) of antimony doped tin oxide fine powder (produced by Sumitomo Cement) and carbon black fine powder (produced by Mitsubishi Kasei: Trademark MA-100), 0.1 g of a 1% aqueous solution of polymeric dispersant (produced by Lion Corporation: Trademark: Polity A300), and 97.85 g of water was mixed, this was subsequently caused to disperse for a period of 10 minutes in an ultrasonic homogenizer (produced by Central Kagaku Corporation: Sonifier 450), and a uniform dispersion fluid was thus prepared.

(2) A coating material (a) for formation of a low refractive index film layer was prepared by means of the following operations.

0.8 g of tetraethoxy silane, 0.8 g of 0.1N hydrochloric acid, and 98.4 g of ethyl alcohol was mixed, and a uniform solution was thus obtained.

(3) Production of Laminated Body

One surface of a transparent glass substrate was set to a temperature of 40° C., the above-described coating material (A) was applied by means of a spin coating method on the surface, desiccation was conducted for a period of 1 minute in hot air at a temperature of 50° C. and an antistatic/high refractive index film layer having a thickness of 0.1 micrometers was formed.

Next, the above-described coating material (a) was applied by means of a spin coating method onto this antistatic/high refractive index film layer of the glass substrate at a temperature of 40° C., this was then desiccated in hot air at a temperature of 50° C., was subjected to a baking process for a period of 20 minutes at a temperature of 150° C., and a low refractive index film layer having a thickness of 0.1 micrometers was formed.

(4) Evaluation

The full spectrum transmissivity, surface resistivity (measured by a surface ohm meter), the surface reflectivity (a one-surface value of the reflectivity of light having a wavelength of 550 nm was measured by means of a spectrophotometer using a mirror reflection jig having an angle of incidence of 5°), of the transparent material laminated body obtained in the above manner, and the adhesion (eraser test, load 1 kg, 20 strokes) of the antistatic/high refractive index film layer and the low refractive index film layer, were measured.

The results of the evaluation are shown in Table 2.

(Preferred Embodiment 7)

Operations were conducted which were identical to those of Preferred Embodiment 6. However, the proportion of carbon black and antimony doped tin oxide in the coating material for formation of an antistatic/high refractive index film layer was such that the ratio of carbon black to antimony doped tin oxide was 1/99 (weight ratio), and 0.1 g of a 1% aqueous solution having polymeric dispersant dissolved therein (produced by Lion Corporation: Polity N100) was added.

The results of the evaluation are shown in Table 2.

(Preferred Embodiment 8)

Operations were conducted which were identical to those of Preferred Embodiment 6. However, the proportion of carbon black and antimony doped tin oxide present in the coating material for formation of an antistatic/high refractive index film layer was such that the ratio of carbon black to antimony doped tin oxide was 20/80 (weight ratio), and furthermore, 0.6 g of a 1% aqueous solution having polymeric dispersant dissolved therein (produced by Lion Corporation: Polity A300) was added.

The results of the evaluation are shown in Table 2.

(Preferred Embodiment 9)

Operations were conducted which were identical to those of Preferred Embodiment 6. However, the proportion of carbon black and antimony doped tin oxide in the coating material for formation of an antistatic/high refractive index film layer was such that the ratio of carbon black to antimony doped tin oxide was 30/70 (weight ratio), and furthermore, 1.0 g of a 1% aqueous solution having dissolved therein a polymeric dispersant (produced by Lion Corporation: Polity A300) was added.

The results of the evaluation are shown in Table 2.

(Preferred Embodiment 10)

Operations were conducted which were identical to those of Preferred Embodiment 6. However, in place of the coating material (a) for formation of a low refractive index film layer, a coating material (b) which was prepared as described hereinbelow was used.

0.4 g of magnesium fluoride fine powder (produced by Sumitomo Cement, Co., Ltd., particle diameter 10 to 20 nm) was mixed with 0.6 g of tetraethoxy silane, 0.6 g of a 0.1N hydrochloric acid, and 98.4 g of ethyl alcohol, and this was uniformly dispersed.

The results of the evaluation are shown in Table 2.

(Comparative Example 3)

Operations were conducted which were identical to those of Preferred Embodiment 6. However, the ratio of carbon black and antimony doped tin oxide in the coating material for formation of an antistatic/high refractive index film layer was 0/100 (weight ratio). That is to say, no carbon black fine powder was included.

The results of the evaluation are shown in Table 2.

(Comparative Example 4)

Operations were conducted which were identical to those of Preferred Embodiment 7. However, the ratio of carbon black to antimony doped tin oxide in the coating material for formation of an antistatic/high refractive index film layer was 40/60 (weight ratio), and furthermore, 1.2 g of a 1% aqueous solution having dissolved therein a polymeric dispersant (produced by Lion Corporation: Polity A300) was added.

The results of the evaluation are shown in Table 2.

From the results of the evaluations shown in Table 2, it was confirmed that the antistatic/anti-reflection film covered transparent material laminated body of the present invention which contained: a transparent substrate; an antistatic/high refractive index film layer, which was formed from the coating material for formation of a antistatic/high refractive index film of the present invention, which comprised an aqueous dispersion fluid containing a mixture of 70 to 99 parts per weight of antimony doped tin oxide fine powder, 1 to 30 parts per weight of a carbon black fine powder, and 0.01 to 0.5 parts per weight with respect to 100 parts per weight of the powder mixture of polymeric dispersant; and a low refractive index film layer formed on the antistatic/high refractive index film layer and having an index of refraction 0.1 or more less than the index of refraction of the antistatic/high refractive index film layer, possesses sufficient light transmissivity, has a low surface resistivity, and reflectivity, and possesses a two-type antistatic effect and anti-reflection effect possessing sufficient practical applicability.

Furthermore, by means of dispersing magnesium fluoride fine powder in the low refractive index film layer, an increase in the anti-reflection function of the antistatic/anti-reflection film covered transparent material laminated body was confirmed.

(Preferred Embodiment 11)

(1) A coating material (A) for formation of antistatic/high refractive index film was prepared as described hereinbelow. (carbon black/antimony doped tin oxide=5/95 [weight ratio])

1.9 g of antimony doped tin oxide fine powder (produced by Sumitomo Cement), 0.1 g of carbon black fine powder (produced by Mitsubishi Kasei: Trademark MA-100), 2.0 g of propylene glycol, 10.0 g of butyl cellosolve, and 86.0 g of water were mixed, this was subsequently caused to disperse for a period of 10 minutes in an ultrasonic homogenizer (produced by Central Kagaku Corporation: Sonifier 450), and a uniform dispersion fluid was thus prepared.

(2) A coating material (a) for formation of a low refractive index film layer was prepared as described hereinbelow.

0.8 g of tetraethoxy silane, 0.8 g of 0.1N hydrochloric acid, and 98.4 g of ethyl alcohol were mixed, and a uniform solution was thus obtained.

(3) Production of Transparent Laminated Body

The above-described coating material (A) was applied by means of a spin coating method to the surface of a glass substrate, the surface temperature thereof being 40° C., and this was desiccated for a period of 1 hour in hot air at a temperature of 50° C. An antistatic/high refractive index film layer having a thickness of 0.1 micrometers was thus formed.

Next, the above-described coating material (a) was applied by means of a spin coating method to this antistatic/high refractive index film layer, the surface temperature thereof being 40° C., and this was desiccated in hot air at a temperature of 50° C., a baking process was conducted for a period of 20 minutes, and a low refractive index film layer having a thickness of 0.1 micrometers was thus formed.

(4) Evaluation

The full spectrum transmissivity, haze, surface resistance value (measured by means of a surface ohm meter), surface reflectivity (a single-surface value of the reflectivity of light having a wavelength of 550 nm, measured by means of a spectrophotometer using a mirror reflection jig having an angle of incidence of 5°), of the transparent material laminated body obtained as described above, and the adhesion (eraser test, load 1 kg, 20 strokes), were measured.

The results of the evaluation are shown in Table 3.

(Preferred Embodiment 12)

Operations were conducted which were identical to those of Preferred Embodiment 11; however, the composition of the coating material for formation of an antistatic/high refractive index film layer was such that the ratio of carbon black (0.02 g) to antimony doped tin oxide (1.98 g) was 1/99 (weight ratio), and 2.0 g of ethylene glycol, 5.0 g of methyl cellosolve, 10.0 g of butyl cellosolve, and 84.0 g of water were used.

The results of the evaluation of the transparent laminated body which was thus obtained are shown in Table 3.

(Preferred Embodiment 13)

Operations were conducted which were identical to those of Preferred Embodiment 11; however, the composition of the coating material for formation of an antistatic/high refractive index film layer was such that the ratio of carbon black (0.4 g) to antimony doped tin oxide (1.6 g) was 20/80 (weight ratio), and 4.0 g of dimethyl sulfoxide, 10.0 g of ethyl cellosolve, and 84.0 g of water were used.

The results of the evaluation of the transparent laminated body which was thus obtained are shown in Table 3.

(Preferred Embodiment 14)

Operations were conducted which were identical to those of Preferred Embodiment 11; however, the composition of the coating material for formation of an antistatic/high refractive index film layer was such that the ratio of carbon black (0.6 g) to antimony doped tin oxide (1.4 g) was 30/70 (weight ratio), and 0.5 g of diethylene glycol, 15.0 g of butyl cellosolve, and 82.5 g of water were used.

The results of the evaluation of the transparent laminated body which was thus obtained are shown in Table 4.

(Preferred Embodiment 15)

Operations were conducted which were identical to those of Preferred Embodiment 11; however, in place of the coating material (a) for formation of a low refractive index film layer, a coating material (b) which was prepared as described hereinbelow was used.

0.4 g of magnesium fluoride fine powder (produced by Sumitomo Cement, Co., Ltd., particle diameter 10 to 20 nanometers) was mixed with 0.6 g of tetraethoxy silane, 0.6 g of 0.1N hydrochloric acid, and 98.4 g of N ethyl alcohol solvent, this was uniformly dispersed, and coating material (b) was obtained.

The results of the evaluation of the transparent laminated body which was thus obtained are shown in Table 4.

(Comparative Example 5)

Operations were conducted which were identical to those of Preferred Embodiment 11; however, the composition of the coating material for formation of an antistatic/high refractive index film layer was such that the ratio of carbon black to antimony doped tin oxide was 0/100 (weight ratio). That is to say, carbon black fine powder was not included, and 10 g of butyl cellosolve, and 88.0 g of water were used.

The results of the evaluation of the transparent laminated body which was thus obtained are shown in Table 5.

(Comparative Example 6)

Operations were conducted which were identical to those of Preferred Embodiment 11; however, the composition of the coating material for formation of an antistatic/high refractive index film layer was such that the ratio of carbon black (0.8 g) to antimony doped tin oxide (1.2 g) was 40/60 (weight ratio) and 4.0 g of formamide, 10.0 g of butyl cellosolve, and 84.0 g of water were used.

The results of the evaluation of the transparent laminated body which was thus obtained are shown in Table 5.

As is clear from the results of the evaluations shown in Tables 3, 4, and 5, an antistatic/anti-reflection film covered transparent material laminated body containing: a transparent substrate; an antistatic/high refractive index film finely filled with solid components and formed from a coating material for formation of an antistatic/high refractive index film containing a solid component comprising 70 to 99 parts per weight of antimony doped tin oxide fine powder and 30 to 1 parts per weight of carbon black fine powder, and 0.1 to 10 parts per weight in 100 parts per weight of the coating material of a solvent possessing a high boiling point and high surface tension; and a low refractive index film which is formed on the antistatic/high refractive index film and which has an index of refraction which is 0.1 or more less than the index of refraction of the antistatic/high refractive index film, was determined to have sufficient light transmissivity, to have a low surface resistance and reflectivity, and to have an antistatic function and anti-reflection function having practical applicability when used for display screens for display devices, covering materials for these devices, window glass, show window glass, display screens of TV Braun tubes, display screens of liquid crystal apparatuses, cover glass for gauges, cover glass for watches, windshield and window glass for automobiles, and front image screens of CRTs.

Furthermore, by dispersing a magnesium fluoride fine powder in the low refractive index film described above, an increase in an anti-reflection function of the antistatic/anti-reflection film covered transparent material laminated body was confirmed.

Hereinbelow, an explanation will be given with respect to Preferred Embodiments of a cathode ray tube in accordance with the present invention.

(Preferred Embodiment 16)

An application fluid having the following composition was prepared.

a: first layer film formation coating material antimony doped tin oxide fine powder (Sumitomo Cement, Co., Ltd.) 1.8 g, carbon black fine powder (Mitsubishi Kasei Corporation: Trademark MA-7) 0.2 g, dispersant (Kao Corporation: Trademark Poizu 521) 0.2 g water 77.8 g, ethanol 10 g, ethyl cellosolve 10 g;

b. second layer film formation coating material tetraethoxy silane 3.5 g, 1N hydrochloric acid 0.8 g, ethanol 95.7 g;

c: method for film formation on the cathode ray tube

The first layer film formation application fluid described above was coated by means of a spin coating method (150 rpm×60 sec) onto the front surface of a face plate of a 14-inch TV Braun tube (cathode ray tube) panel, and a first layer film was thus formed on a face panel of a cathode ray tube 1 as shown in FIG. 1.

Next, the second layer film formation application fluid was coated thereon by means of a similar spin coating method (150 rpm×30 sec), and a second layer film was formed on the first layer film. After this, this panel was placed in a furnace at a temperature of 160° C. for a period of 30 minutes, and baking was conducted, and a film was thus formed on the face panel.

That is to say, as shown in FIG. 1, a first layer 3 was formed on the face surface of a face panel 2 of a cathode ray tube 1, and a second layer film 4 was formed on the first layer film 3. Reference numeral 5 indicates the neck of the cathode ray tube, and reference numeral 6 indicates the electron gun.

The surface resistivity, full spectrum transmissivity, reflectivity, and adhesion (eraser test, load 1 g, 20 strokes) of the cathode ray tube which was thus obtained was evaluated, and the results are shown in Table 6.

In Table 6, a Comparative Example 7 is shown. Herein, the carbon black fine powder was excluded from the first layer film formation application fluid of Preferred Embodiment 16 described above, and using this application fluid, a film was formed on the Braun tube as described above.

As shown in Table 6, the face plate of the cathode ray tube of this Preferred Embodiment has surface resistivity and reflectivity which is lower than the Comparative Example and exhibits a sufficient antistatic effect, electromagnetic wave shielding effect, and anti-reflection effects.

Furthermore, the data of Table 6 exhibit a full spectrum transmissivity lower than that of the Comparative Example; however, in an actual display screen, an increase in contrast can be seen.

(Preferred Embodiment 17)

An application fluid having the following composition was prepared.

a: first layer film formation coating material antimony doped tin oxide fine powder (Sumitomo Cement, Co., Ltd.) 1.9 g, carbon black fine powder (Mitsubishi Kasei Corporation: Trademark MA-100) 0.1 g, 1% aqueous solution of polymeric dispersant (Lion Corporation: Trademark Polity A300) 0.15 g water 97.85 g, b: second layer film formation coating material tetraethoxy silane 0.8 g, 1.0N hydrochloric acid 0.8 g, ethyl alcohol 98.4 g;

c. method for film formation on the cathode ray tube

The above-described first layer film formation application fluid was coated by means of a spin coating method (150 rpm×30 sec) onto the front surface of a face plate of a 17-inch TV Braun tube (cathode ray tube) panel, where the surface was set to a temperature of 40° C. and a first layer film was thus formed on the face plate of a cathode ray tube 1.

Next, the second layer film formation coating material was coated thereon by means of a similar spin coating method (150 rpm×30 sec), and a second layer film was formed on the first layer film. After this, this panel was placed in a furnace at a temperature of 160° C. for a period of 30 minutes, and baking was conducted, and a film was thus formed on the face panel.

By means of the above operations, the cathode ray tube 1 shown in FIG. 1 was obtained.

The surface resistivity, full spectrum transmissivity, reflectivity, and adhesion (eraser test, load 1 g, 20 strokes) of the cathode ray tube which was thus obtained were evaluated, and the results are shown in Table 7.

In Table 7, a Comparative Example 8 is shown; herein, a film was formed on a Braun tube as stated above, using an application fluid in which the carbon black fine powder present in the first layer film formation application fluid of Preferred Embodiment 17 was excluded.

As shown in Table 7, the face panel of the cathode ray tube of this Preferred Embodiment has surface resistivity and reflectivity which are lower than that of the Comparative Example and the sufficient antistatic effect, electromagnetic wave shielding effect, and anti-reflection effects thereof were confirmed.

In the data of Table 7, the full spectrum transmissivity of Preferred Embodiment 17 is lower than that of Comparative Example 8; however, in an actual display screen, an increase in contrast can be seen.

(Preferred Embodiment 18)

An application fluid having the following composition was prepared.

a: First layer film formation coating material antimony doped tin oxide fine powder (Sumitomo Cement, Co., Ltd.) 1.9 g, carbon black fine powder (Mitsubishi Kasei Corporation: Trademark MA-100) 0.1 g, propylene glycol 2.0 g, butyl cellosolve 10.0 g, water 86.0 g, b: Second layer film formation coating material tetraethoxy silane 0.8 g, 1.0N hydrochloric acid 0.8 g, ethyl alcohol 98.4 g;

c: Method for film formation on the cathode ray tube

The above-described first layer film formation coating material was coated by means of a spin coating method (150 rpm×30 sec) onto the front surface of a face panel (image display screen) of a 17-inch TV Braun tube (cathode ray tube), where the surface was set to a temperature of 40° C., and a first layer film was thus formed on the face panel of the cathode ray tube.

Next, the second layer film formation coating material was coated thereon by means of a similar spin coating method (150 rpm×30 sec), and a second layer film was formed on the first layer film. After this, this panel was placed in a furnace at a temperature of 170° C. for a period of 30 minutes, and baking was conducted, and a film was thus formed on the face panel.

By means of the above operations, the cathode ray tube shown in FIG. 1 was obtained.

The surface resistivity, full-spectrum transmissivity, reflectivity, and adhesion (eraser test) of the cathode ray tube which was thus obtained were evaluated, and the results are shown in Table 8.

In Table 8, a Comparative Example 9 is shown; herein, a film was formed on a Braun tube as described above, using an coating material in which the carbon black fine powder present in the first layer film formation coating material of Preferred Embodiment 18 was excluded.

As shown in Table 8, the face panel of the cathode ray tube of this Preferred Embodiment 18 has surface resistivity and reflectivity which are lower than those of Comparative Example 9, so that it was determined that this face panel possesses sufficient antistatic effects, electromagnetic wave shielding effects, and anti-reflection effects.

The full spectrum transmissivity of Preferred Embodiment 18 is shown in Table 8 as being lower than that of Comparative Example 9; however, in an actual display screen, this does not darken the screen, but was found to increase image contrast.

TABLE 1

| | | FILM LAYER COMPOSITION | | | CHARACTERISTICS | | | | |
|---|---|---|---|---|---|---|---|---|---|
| | | ANTISTATIC/ HIGH REFRACTIVE INDEX FILM LAYER | LOW REFRACTIVE INDEX FILM LAYER | (g) | REFRACTED LIGHT BEAM TRANSMISSIVITY (%) | SURFACE RESISTIVITY (Ω/□) | REFLECTIVITY (%) | ADHESION | OVERALL EVALUATION |
| PREFERRED EMBODIMENTS | 1 | CB/ATO = 10/90 | TETRAETHOXY SILANE<br>0.1 N HYDROCHLORIC ACID<br>ETHYL ALCOHOL | 0.8<br>0.8<br>99.2 | 87 | $7 \times 10^5$ | 0.5 | NO DAMAGE | O |
| | 2 | CB/ATO = 1/99 | TETRAETHOXY SILANE<br>0.1 N HYDROCHLORIC ACID<br>ETHYL ALCOHOL | 0.8<br>0.8<br>99.2 | 98 | $9 \times 10^6$ | 0.9 | NO DAMAGE | O |
| | 3 | CB/ATO = 20/80 | TETRAETHOXY SILANE<br>0.1 N HYDROCHLORIC ACID<br>ETHYL ALCOHOL | 0.8<br>0.8<br>99.2 | 71 | $1 \times 10^5$ | 0.4 | NO DAMAGE | O |
| | 4 | CB/ATO = 30/70 | TETRAETHOXY SILANE<br>0.1 N HYDROCHLORIC ACID<br>ETHYL ALCOHOL | 0.8<br>0.8<br>99.2 | 56 | $6 \times 10^4$ | 0.3 | NO DAMAGE | O |
| | 5 | CB/ATO = 10/90 | MAGNESIUM FLUORIDE<br>TETRAETHOXY SILANE<br>WATER<br>0.1 N HYDROCHLORIC ACID<br>ETHYL ALCOHOL | 0.4<br>0.6<br>10<br>0.6<br>89 | 89 | $7 \times 10^5$ | 0.3 | NO DAMAGE | O |
| COMPARATIVE EXAMPLES | 1 | CB/ATO = 0/100 | TETRAETHOXY SILANE<br>0.1 N HYDROCHLORIC ACID<br>ETHYL ALCOHOL | 0.8<br>0.8<br>99.2 | 100 | $4 \times 10^8$ | 1.4 | NO DAMAGE | X |
| | 2 | CB/ATO = 40/60 | TETRAETHOXY SILANE<br>0.1 N HYDROCHLORIC ACID<br>ETHYL ALCOHOL | 0.8<br>0.8<br>99.2 | 32 | $8 \times 10^3$ | 0.2 | DAMAGE PRESENT | X |

CB: Carbon Black,
ATO: Antimony-doped Tin Oxide;
O: Good,
X: Undesirable

TABLE 2

| | | FILM LAYER COMPOSITION | | CHARACTERISTICS | | | | | |
|---|---|---|---|---|---|---|---|---|---|
| | ANTISTATIC/ HIGH REFRACTIVE INDEX FILM LAYER | LOW REFRACTIVE INDEX FILM LAYER | (g) | FULL SPECTRUM TRANSMISSIVITY (%) | HAZE (%) | SURFACE RESISTIVITY (Ω/□) | REFLECTIVITY (%) | ADHESION | OVERALL EVALUATION |
| PREFERRED EMBODIMENTS | 6 CB/ATO = 5/95 A: 0.0015% | TETRAETHOXY SILANE<br>0.1 N HYDROCHLORIC ACID<br>ETHYL ALCOHOL | 0.8<br>0.8<br>98.4 | 94 | 0.0 | $2 \times 10^6$ | 0.5 | NO DAMAGE | O |
| | 7 CB/ATO = 1/99 B: 0.001% | TETRAETHOXY SILANE<br>0.1 N HYDROCHLORIC ACID<br>ETHYL ALCOHOL | 0.8<br>0.8<br>98.4 | 98 | 0.0 | $9 \times 10^6$ | 0.6 | NO DAMAGE | O |
| | 8 CB/ATO = 20/80 A: 0.006% | TETRAETHOXY SILANE<br>0.1 N HYDROCHLORIC ACID<br>ETHYL ALCOHOL | 0.8<br>0.8<br>98.4 | 71 | 0.0 | $1 \times 10^5$ | 0.4 | NO DAMAGE | O |
| | 9 CB/ATO = 30/70 A: 0.01% | TETRAETHOXY SILANE<br>0.1 N HYDROCHLORIC ACID<br>ETHYL ALCOHOL | 0.8<br>0.8<br>98.4 | 56 | 0.1 | $6 \times 10^4$ | 0.3 | NO DAMAGE | O |
| | 10 CB/ATO = 5/95 A: 0.0015% | MAGNESIUM FLUORIDE<br>TETRAETHOXY SILANE<br>0.1 N HYDROCHLORIC ACID<br>ETHYL ALCOHOL | 0.4<br>0.6<br>0.6<br>98.4 | 96 | 0.0 | $2 \times 10^6$ | 0.3 | NO DAMAGE | O |
| COMPARATIVE EXAMPLES | 3 CB/ATO = 0/100 A: 0.006% | TETRAETHOXY SILANE<br>0.1 N HYDROCHLORIC ACID<br>ETHYL ALCOHOL | 0.8<br>0.8<br>98.4 | 100 | 0.0 | $4 \times 10^8$ | 1.2 | NO DAMAGE | X |
| | 4 CB/ATO = 40/60 A: 0.02% | TETRAETHOXY SILANE<br>0.1 N HYDROCHLORIC ACID<br>ETHYL ALCOHOL | 0.8<br>0.8<br>98.4 | 41 | 0.3 | $8 \times 10^3$ | 0.2 | DAMAGE PRESENT | X |

CB: Carbon Black,
ATO: Antimony-doped Tin Oxide;
O: Good,
X: Undesirable;
A: Polity-A300,
B: Polity-N100

TABLE 3

| | | FILM LAYER COMPOSITION | | CHARACTERISTICS | | | | | |
|---|---|---|---|---|---|---|---|---|---|
| | ANTISTATIC/ HIGH REFRACTIVE INDEX FILM LAYER | LOW REFRACTIVE INDEX FILM LAYER | (g) | FULL SPECTRUM TRANSMISSIVITY (%) | HAZE (%) | SURFACE RESISTIVITY (Ω/□) | REFLECTIVITY (%) | ADHESION | OVERALL EVALUATION |
| PREFERRED EMBODIMENTS | 11 CB/ATO = 5/95<br>PG: 2 g<br>BC: 10 g<br>Water: 86 g | TETRAETHOXY SILANE<br>0.1 N HYDROCHLORIC ACID<br>ETHYL ALCOHOL | 0.8<br>0.8<br>98.4 | 94 | 0.0 | $2 \times 10^6$ | 0.5 | NO DAMAGE | O |
| | 12 CB/ATO = 1/99<br>EG: 2 g<br>MC: 5 g<br>BC: 10 g<br>Water: 81 g | TETRAETHOXY SILANE<br>0.1 N HYDROCHLORIC ACID<br>ETHYL ALCOHOL | 0.8<br>0.8<br>98.4 | 98 | 0.0 | $9 \times 10^6$ | 0.6 | NO DAMAGE | O |
| | 13 CB/ATO = 20/80<br>DMSO: 4 g | TETRAETHOXY SILANE<br>0.1 N HYDRO- | 0.8<br>0.8 | 71 | 0.0 | $1 \times 10^5$ | 0.4 | NO DAMAGE | O |

TABLE 3-continued

| | | FILM LAYER COMPOSITION | | | CHARACTERISTICS | | | | |
|---|---|---|---|---|---|---|---|---|---|
| | ANTISTATIC/ HIGH REFRACTIVE INDEX FILM LAYER | LOW REFRACTIVE. INDEX FILM LAYER | (g) | FULL SPECTRUM TRANSMISSIVITY (%) | HAZE (%) | SURFACE RESISTIVITY (Ω/□) | REFLECTIVITY (%) | ADHESION | OVERALL EVALUATION |
| | EC: 10 g<br>Water: 84 g | CHLORIC ACID<br>ETHYL ALCOHOL | <br>98.4 | | | | | | |

CB: Carbon Black,
ATO: Antimony-doped Tin Oxide;
PG: Propylene glycol,
EG: Ethylene glycol,
DMSO: Dimethyl sulfoxide,
BC: Butyl cellosolve,
MC: Methyl cellosolve,
EC: Ethyl cellosolve;
O: Good

TABLE 4

| | | FILM LAYER COMPOSITION | | | CHARACTERISTICS | | | | |
|---|---|---|---|---|---|---|---|---|---|
| | ANTISTATIC/ HIGH REFRACTIVE INDEX FILM LAYER | LOW REFRACTIVE INDEX FILM LAYER | (g) | FULL SPECTRUM TRANSMISSIVITY (%) | HAZE (%) | SURFACE RESISTIVITY (Ω/□) | REFLECTIVITY (%) | ADHESION | OVERALL EVALUATION |
| PREFERRED EMBODIMENTS 14 | CB/ATO = 30/70<br>DEG: 0.5 g<br>BC: 15 g<br>Water: 82.5 g | TETRAETHOXY SILANE<br>0.1 N HYDROCHLORIC ACID<br>ETHYL ALCOHOL | 0.8<br>0.8<br>98.4 | 56 | 0.1 | $6 \times 10^4$ | 0.3 | NO DAMAGE | O |
| 15 | CB/ATO = 5/95<br>PG: 2 g<br>BC: 10 g<br>Water 86 g | MAGNESIUM FLUORIDE<br>TETRAETHOXY SILANE<br>0.1 N HYDROCHLORIC ACID<br>ETHYL ALCOHOL | 0.4<br>0.6<br>0.6<br>98.4 | 96 | 0.0 | $2 \times 10^6$ | 0.3 | NO DAMAGE | O |

CB: Carbon Black,
ATO: Antimony-doped Tin Oxide;
PG: Propylene glycol,
DMSO: Dimethyl sulfoxide,
DEG: Diethylene glycol,
BC: Butyl cellosolve;
O: Good

TABLE 5

| | | FILM LAYER COMPOSITION | | | CHARACTERISTICS | | | | |
|---|---|---|---|---|---|---|---|---|---|
| | ANTISTATIC/ HIGH REFRACTIVE INDEX FILM LAYER | LOW REFRACTIVE INDEX FILM LAYER | (g) | FULL SPECTRUM TRANSMISSIVITY (%) | HAZE (%) | SURFACE RESISTIVITY (Ω/□) | REFLECTIVITY (%) | ADHESION | OVERALL EVALUATION |
| COMPARATIVE EXAMPLES 5 | CB/ATO = 0/100<br>BC: 10 g<br>Water: 88 g | TETRAETHOXY SILANE<br>0.1 N HYDROCHLORIC ACID<br>ETHYL ALCOHOL | 0.8<br>0.8<br>98.4 | 100 | 0.0 | $4 \times 10^8$ | 1.2 | NO DAMAGE | X |
| 6 | CB/ATO = 40/60<br>FA: 4 g<br>BC: 10 g<br>Water: 84 g | TETRAETHOXY SILANE<br>0.1 N HYDROCHLORIC ACID<br>ETHYL ALCOHOL | 0.8<br>0.8<br>98.4 | 41 | 0.3 | $8 \times 10^3$ | 0.2 | DAMAGE PRESENT | X |

CB: Carbon Black,
ATO: Antimony-doped Tin Oxide;
BC: Butyl cellosolve;
X: Undesirable

TABLE 6

| | SURFACE RESISTIVITY (Ω/□) | RELECTIVITY (%) | FULL-SPECTRUM TRANSMISSIVITY (%) | ADHESION |
|---|---|---|---|---|
| PREFEFFED EMBODIMENT 16 | $4 \times 10^5$ | 0.58 | 84 | NO SEPARATION |
| COMPARATIVE EXAMPLE 7 | $6 \times 10^8$ | 1.42 | 99 | NO SEPARATION |

TABLE 7

| | SURFACE RESISTIVITY (Ω/□) | RELECTIVITY (%) | FULL-SPECTRUM TRANSMISSIVITY (%) | ADHESION |
|---|---|---|---|---|
| PREFEFFED EMBODIMENT 17 | $2 \times 10^6$ | 0.55 | 92 | NO SEPARATION |
| COMPARATIVE EXAMPLE 8 | $4 \times 10^8$ | 1.45 | 99 | NO SEPARATION |

TABLE 8

| | SURFACE RESISTIVITY (Ω/□) | RELECTIVITY (%) | FULL-SPECTRUM TRANSMISSIVITY (%) | ADHESION |
|---|---|---|---|---|
| PREFEFFED EMBODIMENT 18 | $2 \times 10^6$ | 0.55 | 92 | NO SEPARATION |
| COMPARATIVE EXAMPLE 9 | $4 \times 10^8$ | 1.45 | 99 | NO SEPARATION |

What is claimed is:

1. A coating material for forming a transparent antistatic high refractive index film, said coating material comprising a dispersion fluid containing a mixture containing 70 to 99 parts per weight of antimony doped tin oxide fine powder and 1 to 30 parts per weight of black colored conductive fine powder, wherein said antimony doped tin oxide fine powder has an average particle diameter within a range of 1 to 100 nm.

2. An antistatic/high refractive index film formation coating material in accordance with claim 1, wherein polymeric dispersant is further contained in said mixture, and said dispersion fluid comprising an aqueous dispersion fluid.

3. An antistatic/high refractive index film formation coating material in accordance with claim 2, wherein said polymeric dispersant comprises a dispersant selected from the group consisting of anionic polymeric polycarboxylate, polystyrene sulfonate, and salts of naphthalene sulfonic acid condensates.

4. An antistatic/high refractive index film formation coating material in accordance with claim 2, wherein in said mixture, an mount of polymeric dispersant contained is within a range of 0.01 to 0.5 parts per weight with respect to 100 total parts per weight contained of antimony doped tin oxide fine powder and black colored conductive fine powder.

5. An antistatic/high refractive index film formation coating material in accordance with claim 1, wherein said dispersion fluid contains said mixture and a solvent possessing a high boiling point and a high surface tension.

6. An antistatic/high refractive index film formation coating material in accordance with claim 5, wherein the boiling point of said solvent is equal to or greater than 150° C., and the surface tension thereof is greater than or equal to 40 dyne/cm.

7. An antistatic/high refractive index film formation coating material in accordance with claim 5, wherein said solvent comprises a solvent selected from the group consisting of ethylene glycol, propylene glycol, formamide, dimethyl sulfoxide, and diethylene glycol.

8. An antistatic/high refractive index film formation coating material in accordance with claim 5, wherein said dispersion fluid contains a solvent possessing a high boiling point and high surface tension within a range of 0.1 to 10 parts per weight with respect to 100 parts per weight of said dispersion fluid.

9. An antistatic/high refractive index film formation coating material in accordance with one of claim 1, wherein said black colored conductive fine powder comprises carbon black fine powder.

* * * * *